March 24, 1925.
C. C. GIBSON
APPLE CORER
Filed June 12, 1924 2 Sheets-Sheet 1
1,530,822
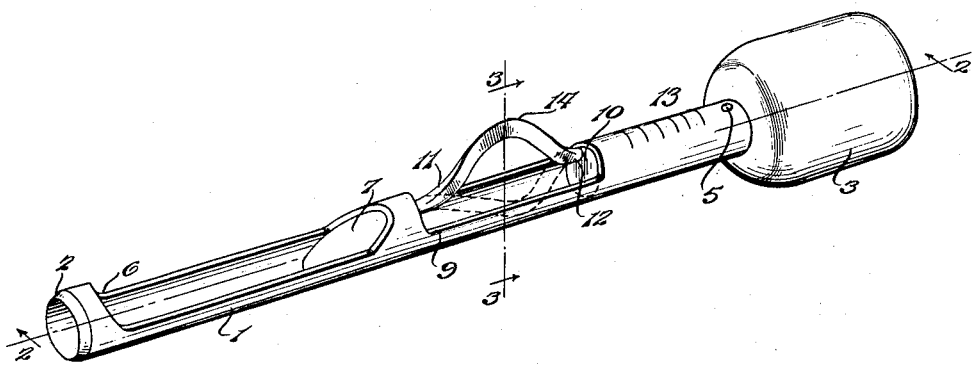
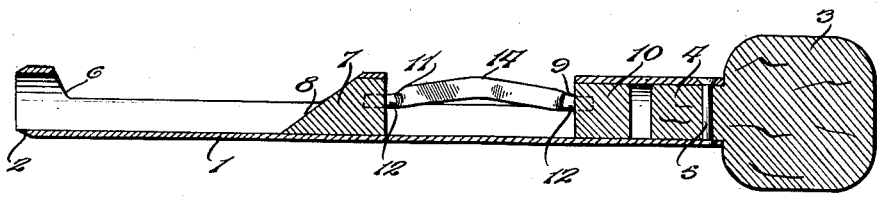
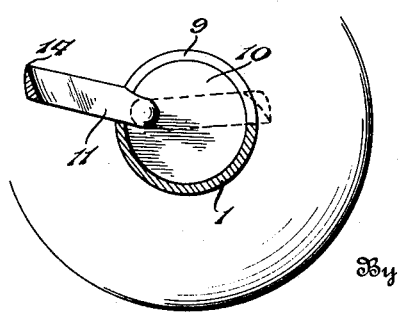
Inventor
C. C. Gibson
By Lacey & Lacey, Attorneys March 24, 1925.
C. C. GIBSON
APPLE CORER
Filed June 12, 1924  2 Sheets-Sheet 2
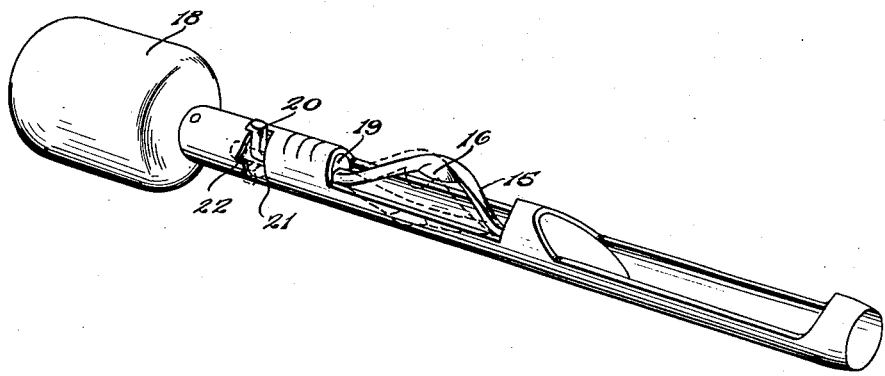
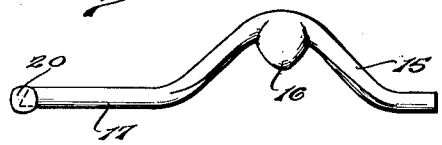
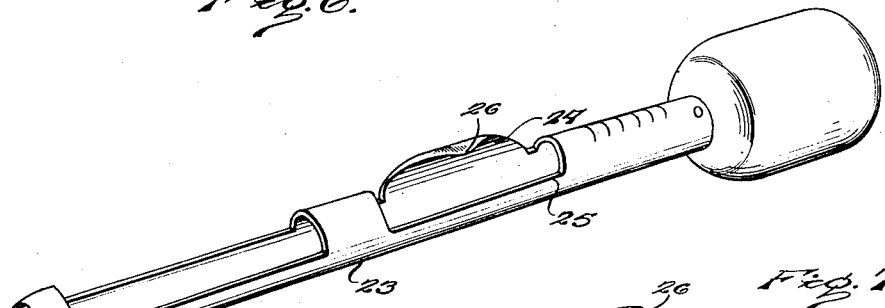
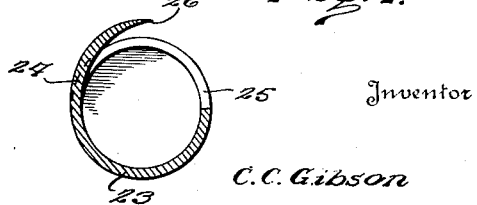
Inventor
C. C. Gibson
By Lacey & Lacey, Attorneys Patented Mar. 24, 1925.

1,530,822

UNITED STATES PATENT OFFICE.

CHARLES C. GIBSON, OF DAVENPORT, WASHINGTON.

APPLE CORER.

Application filed June 12, 1924. Serial No. 719,562.

*To all whom it may concern:*

Be it known that I, CHARLES C. GIBSON, a citizen of the United States, residing at Davenport, in the county of Lincoln and State of Washington, have invented certain new and useful Improvements in Apple Corers, of which the following is a specification.

My invention is a device for removing cores from apples and similar fruit and has for its object the provision of a simple and efficient tool which may be easily manipulated to remove the core from the fruit and also remove the seed-containing center. The invention seeks to provide a tool which will occupy small space when not in use and which will be so constructed that it may be readily inserted in the fruit and after being inserted will automatically cause the seed-containing center to be properly engaged so that rotation of the tool will remove the seeds and the sacks enclosing them. Other objects of the invention will appear incidentally in the course of the following description, and the invention resides in certain novel features which will be particularly pointed out in the appended claims.

In the accompanying drawings:

Figure 1 is a perspective view showing one embodiment of my invention;

Fig. 2 is a central longitudinal section of the same;

Fig. 3 is an enlarged transverse section on the line 3—3 of Fig. 1;

Fig. 4 is a perspective view showing another embodiment of the invention;

Fig. 5 is a detail view of the knife illustrated in Fig. 4;

Fig. 6 is a perspective view of a third embodiment of the invention, and

Fig. 7 is an enlarged detail transverse section of the knife shown in Fig. 6.

In carrying out my invention, I employ a metal tube 1 having one end beveled, as shown at 2, to constitute a cutter whereby the tube may be easily inserted into and through the fruit to enclose and remove the core. At the opposite end of the tube, I provide a handle 3 which may be of any desired configuration and is preferably in the form of a wooden knob having a central tenon or tongue 4 adapted to enter the end of the tube 1 and fill the same, being retained in the tube by a pin or similar device, indicated at 5. The tube is cut away at one side from a point adjacent the beveled end 2 to a point approximately midway its ends, as indicated at 6, and at the inner end of this cut-away portion a plug 7 is fitted in the tube, said plug having its end presented to the open beveled end of the tube disposed obliquely, as shown at 8 in Fig. 2, whereby the end of the core may be deflected laterally. The tube is constructed with a second cut-away portion 9 alined with the cut-away portion 6 and extending from the plug 7 to a point near the tenon or tongue 4 of the handle where a second plug 10 is inserted, the plugs 7 and 9 providing bearings for the knife 11. The said knife consists of an arcuate blade having its ends 12 circular in cross section whereby they may be easily received in sockets provided therefor in the respective plugs and easily rotated in said sockets. Between the plug 10 and the handle 3, a series of graduations 13 are marked upon the outer surface of the tube, and these graduations serve to indicate when the knife 11 is at the center of the fruit and in proper position to cut the seeds therefrom.

The knife 11 is mounted eccentrically in the plugs 7 and 19, as shown clearly in Fig. 3, and, in the form shown in Figs. 1, 2 and 3, the central portion of the knife is beveled to provide a cutting edge, as shown at 14. In using the device, the knife is arranged initially as shown in dotted lines in Figs. 1 and 3, resting upon that wall of the cut-away portion 9 which is more remote from the bearings of the knife so that the cutting edge will project very little, if any, beyond the side of the tube. The fruit to be cored is placed upon a table or other support or held in the hand as the user may prefer, and the tool is then inserted into the fruit at either the stem or the bud side and pushed through the fruit so that the cutter 2 will penetrate the entire body of the fruit and cut the core therefrom. The length of the tube from the cutter 2 to the plug 7 will accommodate the maximum diameter of fruits in the normal crops. When the tool is pushed through a second fruit eventually the end of the first core will be forced against the plug 7 so that the continued progress of the tool will deflect the upper end of the core and effect its removal. As the tool progresses through the fruit, the knife 11 will enter the same and inasmuch as, in the dotted line position shown in Figs. 1 and 3, the cutting edge of the knife projects very slightly beyond the side of the tube or body of the tool the knife may be easily inserted in the fruit. When the cutting edge 14 of the knife is at the center of the fruit, as will be indicated by the proper graduation 13 registering with the upper side of the fruit, the tool is rotated about its longitudinal axis toward the left, and this action will cause the tube 1 to move relatively to the knife so that eventually the back of the knife will be engaged by the wall of the cut-away portion 9, as indicated in Fig. 3, whereupon the continued rotation of the tube will cause the knife to rotate within the fruit and cut therefrom the seeds and the seed-containing sacks. The seeds and sacks will be received in the cut-away portion 9 and withdrawn with the tool and, to prevent excessive cutting away of the fruit, the tool may be given a reverse rotation before withdrawing so that the knife and the tube or body of the tool will resume the relations indicated by the dotted lines in Fig. 3.

In Fig. 4, I have shown an embodiment of the invention differing from that shown in Fig. 1 in that the knife 15 is provided with a sharpened tooth 16 at the center of its arcuate portion which is very efficient in deflecting the seeds and seed-containing sacks into the cut-away portion of the tube, and that end of the knife 17 which is nearer the handle 18 of the tool is extended through the inner plug or bearing 19 and provided at its extremity with a lateral lug 20. This lug 20 plays in a circumferential slot 21 formed in the main tube or body of the tool and in that wall of the said slot which is nearer the handle 18 is formed a notch 22 which is adapted to engage the said lug and thereby limit the turning movement of the knife. The swinging of the knife to open position is thus limited so that this form of the tool is especially adapted for use in coring small apples or other fruit, and it will be understood that the lug 20 projects beyond the circumference of the main body of the tool so that it may be manually set in engagement with the shoulder 22 before the knife is caused to penetrate the cored fruit.

In Fig. 6, I have shown a form of the invention in which the main body or tube 23 is of the same general form as that shown in the previously described embodiments, but both bearing plugs are omitted and the knife 24 is formed integral with the main body of the tool, being defined by a lip projecting eccentrically from one side of the cut-away portion 24 and having its edge in the form of a spear or arrow head with its point 26 sharpened so as to readily penetrate the meat of the fruit. The action of \this form of the invention is the same as the action of the first described forms except that the knife does not have a turning movement relative to the tubular body.

In all the described forms of the invention there is a coring element and a seed-removing element assembled in compact relation upon a single body and easily manipulated in a continuous uninterrupted process. The tool may be produced very cheaply and will be found highly efficient for the purposes for which it is designed. In assembling the parts, the plug 7 is inserted, the knife then placed in position, after which the plug 10 is inserted so as to engage the bearing end of the knife and cause the knife to be properly supported between the two plugs. The handle is then inserted in the end of the tubular body and secured by the retaining pin or its equivalent. If it be necessary to renew the knife or any other part, a reverse proceeding will readily effect disassembling of the parts so that the needed repairs may be easily made.

Having thus described the invention, I claim:

1. A fruit corer comprising a tubular body, a circular cutter at one end of the body whereby to separate a core from a fruit as the body is forced through the fruit, the side of the body being cut-away adjacent said cutter and having a second cut-away portion in its side adjacent the inner end of the first-mentioned cut-away portion, an element closing the inner end of the first-mentioned cut-away portion whereby to effect removal of the core, and a knife extending longitudinally of the second-mentioned cut-away portion and provided with an arcuate edge whereby to remove seeds upon rotation of the tubular body after removal of the core, the removal of the entire core and subsequent removal of seeds constituting a continuous operation.

2. A fruit corer comprising a tubular body, a circular cutter at one end of the body, the side of the body being cut-away adjacent said cutter and the body having a second cut-away portion adjacent the inner end of the first-mentioned cut-away portion, plugs fitted in the body at the ends of the second-mentioned cut-away portion, and an arcuate knife mounted eccentrically in and extending between said plugs.

3. A fruit corer comprising a tubular body having a circular cutter at one end and having its side cut-away at a point removed from said end, plugs fitted in the body at the ends of said cut-away portion, and a knife extending between the plugs and rotatably mounted eccentrically therein whereby to be substantially housed within the tubular body to enter the fruit or to project from the body into the fruit upon rotation of the body whereby to remove the fruit seeds.

4. A fruit corer comprising a tubular body having a core-removing cutter at one end and provided with a cut-away portion in one side between its ends, plugs within the body at the ends of the cut-away portion, the body being further provided adjacent one of the plugs with a circumferential slot having a shoulder in one wall, and a knife rotatably mounted in the plugs and having one end extended through the plug in which it is engaged and provided with a lateral lug playing in said circumferential slot and adapted to engage the shoulder in the wall of said slot.

In testimony whereof I affix my signature.

CHARLES C. GIBSON. [L. S.]